(12) United States Patent
Wang et al.

(10) Patent No.: US 11,790,566 B2
(45) Date of Patent: Oct. 17, 2023

(54) METHOD AND APPARATUS FOR FEATURE SUBSTITUTION FOR END-TO-END IMAGE COMPRESSION

(71) Applicant: TENCENT AMERICA LLC, Palo Alto, CA (US)

(72) Inventors: Xiao Wang, Boston, MA (US); Wei Jiang, San Jose, CA (US); Wei Wang, Palo Alto, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 366 days.

(21) Appl. No.: 17/242,534

(22) Filed: Apr. 28, 2021

(65) Prior Publication Data

US 2021/0358179 A1 Nov. 18, 2021

Related U.S. Application Data

(60) Provisional application No. 63/026,409, filed on May 18, 2020, provisional application No. 63/023,694, filed on May 12, 2020.

(51) Int. Cl.
*G06T 9/00* (2006.01)
*G06N 3/08* (2023.01)
*G06T 3/40* (2006.01)
*G06N 3/045* (2023.01)

(52) U.S. Cl.
CPC ............. *G06T 9/002* (2013.01); *G06N 3/045* (2023.01); *G06N 3/08* (2013.01); *G06T 3/40* (2013.01)

(58) Field of Classification Search
CPC ........... G06T 9/002; G06T 3/40; G06N 3/045; G06N 3/08; G06N 3/084; H04N 19/147; H04N 19/19; H04N 19/192
See application file for complete search history.

(56) References Cited

U.S. PATENT DOCUMENTS

| | | | |
|---|---|---|---|
| 11,677,948 B2 * | 6/2023 | Besenbruch | G06N 3/045 |
| | | | 375/240.03 |
| 2007/0098283 A1 | 5/2007 | Kim et al. | |
| 2014/0212033 A1 | 7/2014 | Liang | |
| 2015/0381938 A1 | 12/2015 | Cunico et al. | |
| 2017/0230675 A1 | 8/2017 | Wierstra et al. | |

(Continued)

FOREIGN PATENT DOCUMENTS

JP 2020-53820 A 4/2020

OTHER PUBLICATIONS

Agustsson E, Theis L. Universally quantized neural compression. Advances in neural information processing systems. 2020;33: 12367-76. (Year: 2020).*

(Continued)

*Primary Examiner* — Fayyaz Alam
(74) *Attorney, Agent, or Firm* — Sughrue Mion, PLLC

(57) ABSTRACT

A method of feature substitution for end-to-end image compression, is performed by at least one processor and includes encoding an input image, using a first neural network, to generate an encoded representation, and quantizing the generated encoded representation, using a second neural network, to generate a compressed representation. The first neural network and the second neural network are trained by determining a rate loss, based on a bitrate of the generated compressed representation, and updating the generated encoded representation, based on the determined rate loss.

20 Claims, 7 Drawing Sheets

(56) References Cited

U.S. PATENT DOCUMENTS

| | | | |
|---|---|---|---|
| 2020/0007861 A1 | 1/2020 | Zhao et al. | |
| 2020/0126187 A1* | 4/2020 | Park | H04N 21/23439 |
| 2020/0304802 A1* | 9/2020 | Habibian | H04N 19/20 |
| 2023/0154055 A1* | 5/2023 | Besenbruch | H04N 19/126 |
| | | | 375/240.03 |

OTHER PUBLICATIONS

Löhdefink J, Hüger F, Schlicht P, Fingscheidt T. Scalar and vector quantization for learned image compression: A study on the effects of MSE and GAN loss in various spaces. In2020 IEEE 23rd International Conference on Intelligent Transportation Systems (ITSC) Sep. 20, 2020 (pp. 1-8). IEEE. (Year: 2020).*

Williams W, Ringer S, Ash T, MacLeod D, Dougherty J, Hughes J. Hierarchical quantized autoencoders. Advances in Neural Information Processing Systems. 2020;33:4524-35. (Year: 2020).*

Extended European Search Report dated Oct. 20, 2022 in European Application No. 21804355.2.

Fei Yang et al., "Variable Rate Deep Image Compression With Modulated Autoencoder", IEEE Signal Processing Letters, 2020, vol. 27, pp. 331-335 (5 pages total).

International Search Report dated Aug. 13, 2021 in International Application No. PCT/US2021/031334.

Written Opinion of the International Searching Authority dated Aug. 13, 2021 in International Application No. PCT/US2021/031334.

Chao-Yuan Wu et al., "Video Compression through image interpolation", Proceedings of the European Conference on Computer Vision (ECCV), 2018, Retrieved from: URL: <https://openaccess.thecvf.com/content_ECCV_2018/html/Chao-Yuan_Wu_Video_Compression_through_ECCV_2018_paper.html> (17 pages total).

Johannes Balle et al., "End-To-End Optimized Image Compression", ICLR, Mar. 3, 2017, 27 pgs.

Japanese Office Action dated May 25, 2023 in Japanese Application No. 2022-523026.

* cited by examiner

METHOD AND APPARATUS FOR FEATURE SUBSTITUTION FOR END-TO-END IMAGE COMPRESSION

CROSS-REFERENCE TO RELATED APPLICATIONS

This application is based on and claims priority to U.S. Provisional Patent Application No. 63/023,694, filed on May 12, 2020, and U.S. Provisional Patent Application No. 63/026,409, filed on May 18, 2020, the disclosures of which are incorporated by reference herein in their entireties.

BACKGROUND

Standard groups and companies have been actively searching for potential needs for standardization of future video coding technology. Some have focused on artificial intelligence (AI)-based end-to-end (E2E) image and video compression.

Although prior arts have shown promising performance, the following two issues of E2E image compression remain open. First, it may be difficult to achieve bitrate control, in which each deep neural network (DNN) model is trained with a target bitrate, because it may not work well if applied to compress images with other bitrates. Second, each DNN model may be trained to optimize some target training loss, such as a peak signal-to-noise ratio (PSNR) and/or a structural similarity index measure (SSIM), which may not work well for other target training losses. In other words, to provide the flexibility of compressing input images with different bitrates or using different target metrics, multiple DNN models may need to be trained, stored, and deployed, which may be too expensive in both storage and computation to be practical.

SUMMARY

According to embodiments, a method of feature substitution for end-to-end image compression, is performed by at least one processor and includes encoding an input image, using a first neural network, to generate an encoded representation, and quantizing the generated encoded representation, using a second neural network, to generate a compressed representation. The first neural network and the second neural network are trained by determining a rate loss, based on a bitrate of the generated compressed representation, and updating the generated encoded representation, based on the determined rate loss.

According to embodiments, an apparatus for feature substitution for end-to-end image compression, includes at least one memory configured to store program code, and at least one processor configured to read the program code and operate as instructed by the program code. The program code includes encoding code configured to cause the at least one processor to encode an input image, using a first neural network, to generate an encoded representation, and quantizing code configured to cause the at least one processor to quantize the generated encoded representation, using a second neural network, to generate a compressed representation. The first neural network and the second neural network are trained by determining a rate loss, based on a bitrate of the generated compressed representation, and updating the generated encoded representation, based on the determined rate loss.

According to embodiments, a non-transitory computer-readable medium stores instructions that, when executed by at least one processor for feature substitution for end-to-end image compression, cause the at least one processor to encode an input image, using a first neural network, to generate an encoded representation, and quantize the generated encoded representation, using a second neural network, to generate a compressed representation. The first neural network and the second neural network are trained by determining a rate loss, based on a bitrate of the generated compressed representation, and updating the generated encoded representation, based on the determined rate loss.

DETAILED DESCRIPTION

The disclosure describes a method and an apparatus for compressing an input image by learning a substitutional encoded feature representation through E2E DNN. The learned substitutional encoded feature representation is an alteration of an originally-encoded feature representation, and can be used to effectively reconstruct images with improved compression performance, as well as providing the ability of flexible bitrate control and compression target control. The input image may satisfy a desired bitrate that is defined by a user.

Figure 1:
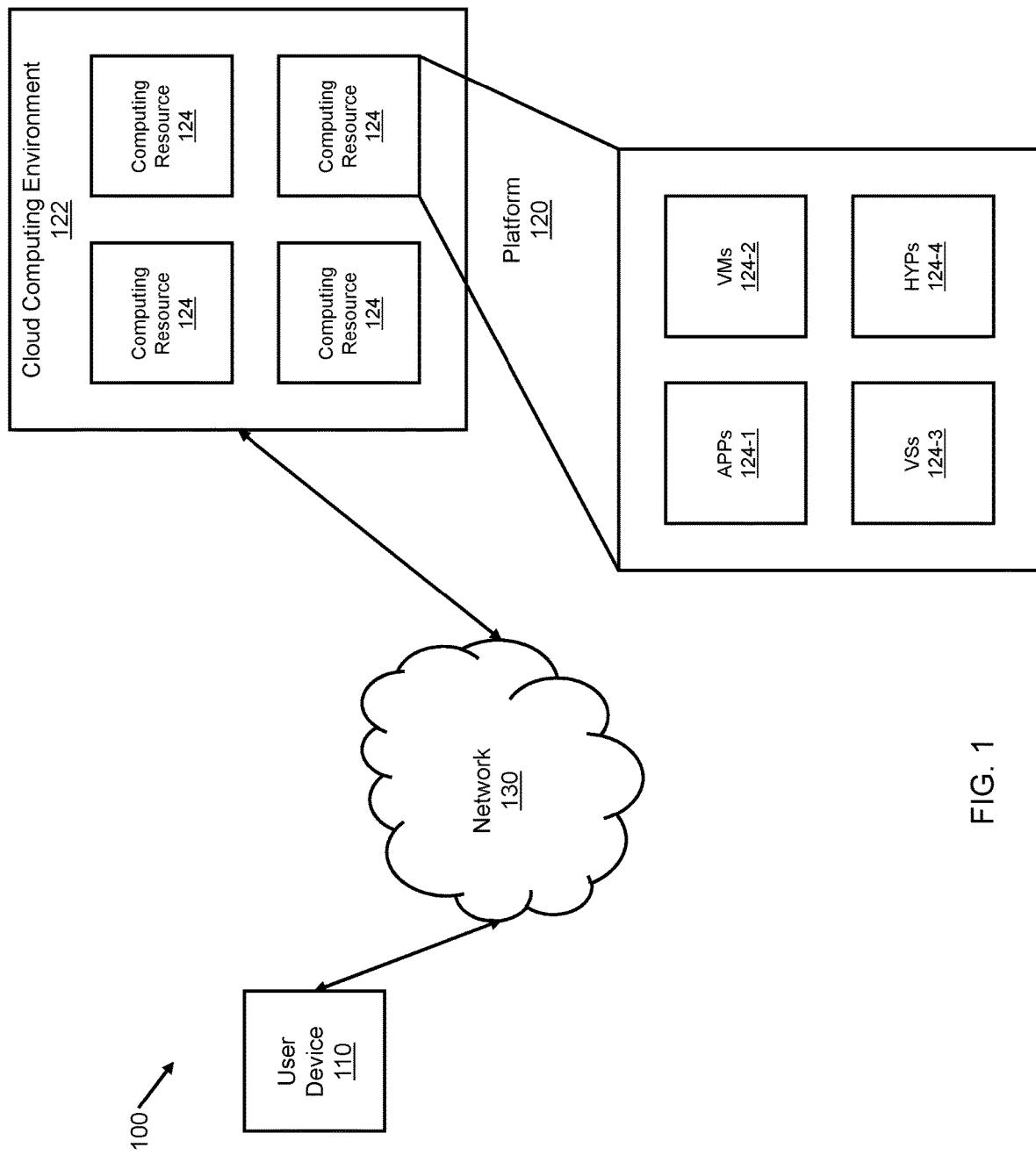
FIG. 1 is a diagram of an environment in which methods, apparatuses and systems described herein may be implemented, according to embodiments.

FIG. 1 is a diagram of an environment 100 in which methods, apparatuses and systems described herein may be implemented, according to embodiments.

As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g., the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g., a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g., the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g., "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

Figure 2:
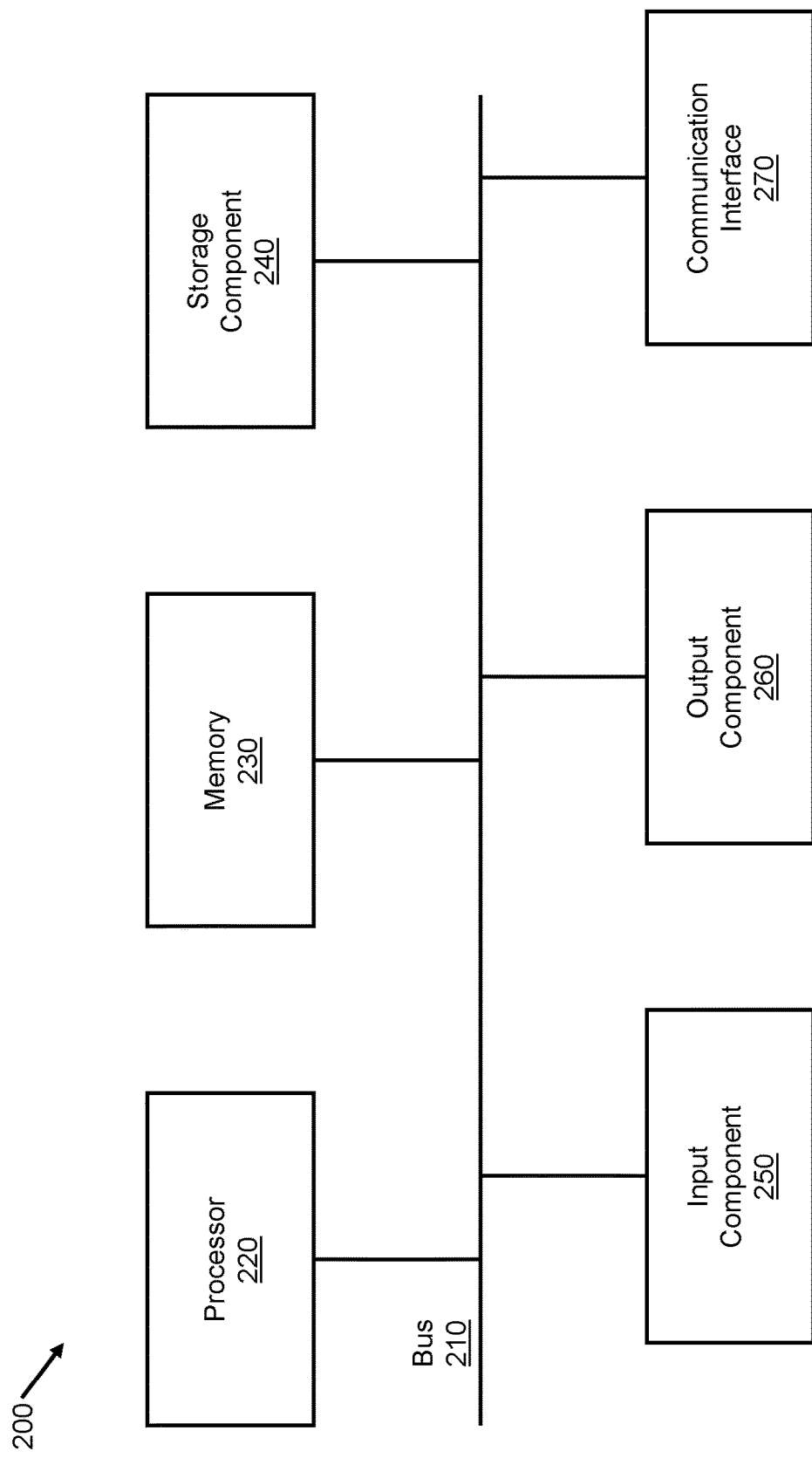
FIG. 2 is a block diagram of example components of one or more devices of FIG. 1.

FIG. 2 is a block diagram of example components of one or more devices of FIG. 1.

A device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). Additionally, or alternatively, the input component 250 may include a sensor for sensing information (e.g., a global positioning system (GPS) component, an accelerometer, a gyroscope, and/or an actuator). The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

A method and an apparatus for feature substitution for end-to-end image compression will now be described in detail.

The disclosure describes an E2E image compression by learning a substitutional encoded feature representation.

Given an input image x of size (h,w,c), where h, w, c are a height, a width and a number of channels, respectively, a target of E2E image compression is described as follows, in which a compressed (quantized) representation y' that is compact for storage and transmission is computed. Then, based on the computed compressed representation y', an output image x' is reconstructed so that the reconstructed image x' and the original input image x may be similar. A loss function D(x, x') is used to measure a reconstruction error, i.e., a distortion loss such as a PSNR and/or an SSIM. In embodiments, the DNN that computes the compressed representation y' may have two parts: an encoder that generates an encoded representation y based on the input image x, and a quantizer that generates the compressed representation y' based on the encoded representation y. A DNN that reconstructs the output image x' is a decoder.

Given the input image x, an apparatus goes through a training stage first to learn a substitutional encoded feature representation ŷ, which is then used in a test stage to generate a compressed (quantized) representation ŷ' and a reconstructed image x̂'.

Figure 3A:
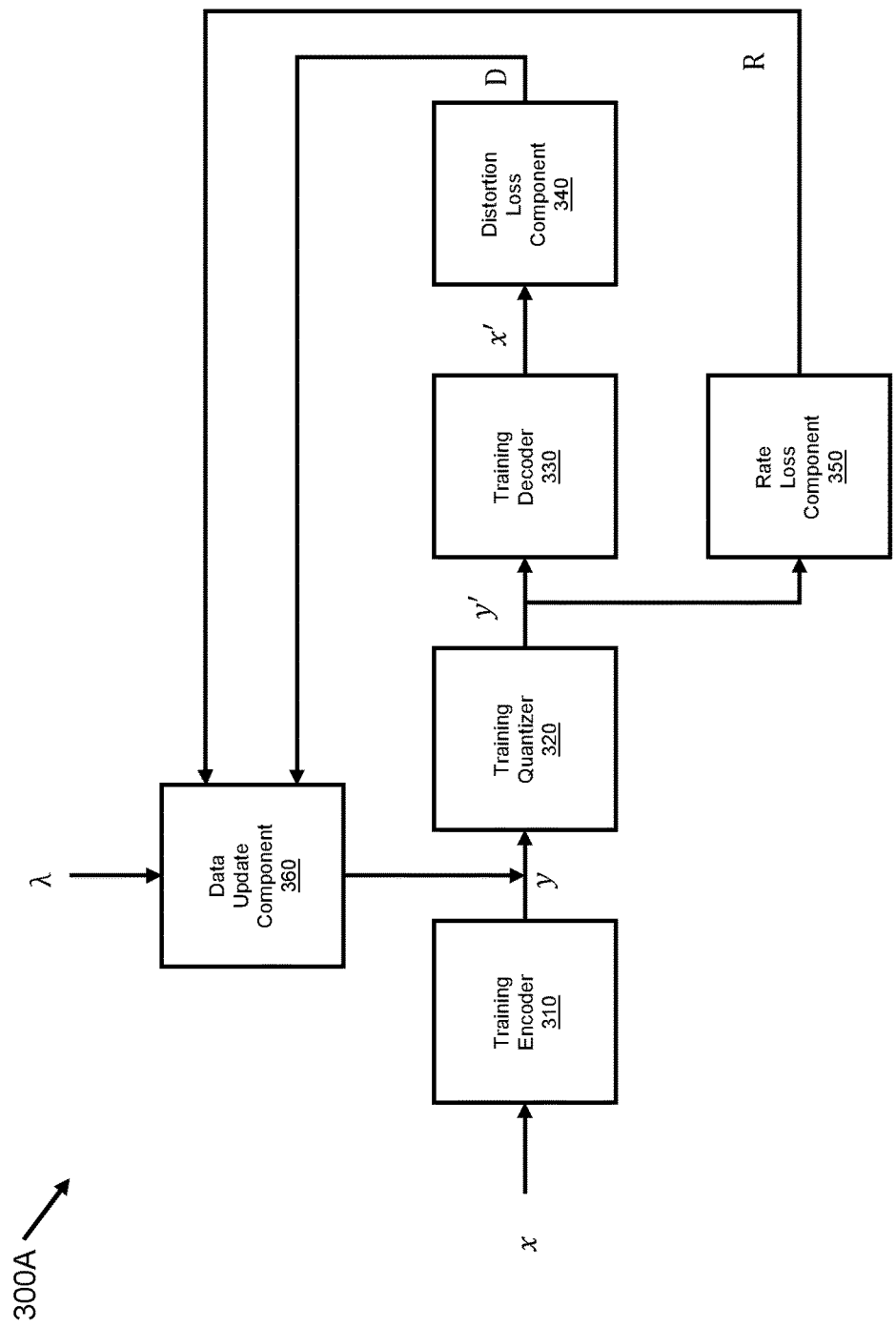
FIG. 3A is a block diagram of a training apparatus for feature substitution for end-to-end image compression, during a training stage, according to embodiments.

FIG. 3A is a block diagram of a training apparatus 300A for feature substitution for end-to-end image compression, during a training stage, according to embodiments.

As shown in FIG. 3A, the training apparatus 300A includes a training encoder 310, a training quantizer 320, a training decoder 330, a distortion loss component 340, a rate loss component 350 and a data update component 360.

For each input image x, the training encoder 310, the training quantizer 320 and the training decoder 330 are DNNs, and their model weights are initialized or set based on a predetermined encoder, a predetermined quantizer, and a pre-determined decoder, respectively. Then, a retraining/finetuning process is conducted to compute the updated substitutional encoded feature representation ŷ. The training quantizer 320 generates the new compressed (quantized) representation ŷ', based on the computed substitutional encoded feature representation ŷ, and the training decoder 330 generates the new reconstructed image based on the generated new compressed representation ŷ'. A target of the retraining/finetuning process is to optimize (minimize) an overall loss L(x,ŷ',x̂') including the following two parts:

$$L(x,y',\hat{x}')=R(\hat{y}')+\lambda D(x,\hat{x}). \qquad (1)$$

The distortion loss component 340 determines the same distortion loss D(x, x̂') measuring the reconstruction error. The rate loss component 350 determines a rate loss R(x̂') that is related to a bitrate of the compressed representation ŷ'. An entropy estimation approach may be used, in which a predetermined rate loss estimator is used to compute the rate loss R(ŷ'). A hyperparameter λ balances contributions of different loss terms. The data update component 360 determines the overall loss L(x,ŷ',x̂), based on the determined distortion loss D(x,x̂), the determined rate loss R(ŷ') and the input hyperparameter λ.

The weights of the predetermined encoder, the predetermined quantizer, the predetermined decoder, and the predetermined rate loss estimator are pre-trained based on a set of training images. In detail, for each training image $x_{tr}$, the same forward inference computation is conducted through encoding, quantization, and decoding to compute a reconstructed image $x_{tr}'$. Then, a distortion loss $D(x_{tr}, x_{tr}')$ and a rate loss $R(x_{tr})$ are computed. Then, given a pre-trained hyperparameter $\lambda_{tr}$, an overall loss $L(x_{tr}, x_{tr}')$ can be computed based on Equation (1), whose gradients are used to update the weights of the pre-trained encoder, the pre-trained quantizer, the pre-trained decoder, and the pre-trained rate loss estimator through backpropagation.

During the training stage, for each input image x, in the retraining/finetuning process, the training encoder 310, the training quantizer 320, the training decoder 330 and the rate loss estimator are initialized, and the training encoder 310 initializes an initial encoded representation yo to be the encoded representation y. After that, for a t-th iteration, the training quantizer 320 computes a compressed (quantized) representation $y_t'$, and the training decoder 330 computes a reconstructed image $x_t'$, based on the quantized representation $y_t$. The distortion loss component 340 computes a distortion loss $D(x, x_t')$ and a rate loss $R(y_t')$. Then, the data update component 360 computes gradients of a joint loss $L(x, y_t', x_t')$ to update a substitutional encoded feature representation $y_{t+1}$ through backpropagation. Finally, after T iterations, an optimal substitutional encoded feature representation $\hat{y} = y_T$ is output.

Further, the disclosure describes an E2E image compression method by learning a substitutional encoded feature representation, with a bitrate constraint.

A bitrate of a compressed representation y' is denoted by B(y'). A large bitrate B(y') may result in small distortion of a reconstructed image x', while a small bitrate B(y') may result in a large distortion of the reconstructed image x'. R(y') denotes a rate loss related to the bitrate B(y'). Given a target bitrate $B_{target}$, which is associated with a target rate loss $R_{target}$, the compressed representation y' is to have the bitrate B(y') as close to the target bitrate $B_{target}$ as possible. Therefore, an overall loss can be defined as follows:

$$L(x, y', x') = \eta L(R(y'), R_{target}) + D(x, x'). \quad (2)$$

$L(R(y'), R_{target})$ measures a loss of a difference between the rate loss R(y') and the target rate loss $R_{target}$, and $\eta$ is a hyperparameter that balances contributions of different loss terms. The hyperparameter $\eta$ may be empirically set as a large number to ensure the real bitrate to be as close to the target bitrate as possible. Also, the loss of the difference between the rate loss R(y') and the target rate loss $R_{target}$ may be set as follows:

$$L(R(y'), R_{target}) = \min(R(y') - R_{target}, \epsilon). \quad (3)$$

$\epsilon$ is a hyperparameter, which may be a very small number.

Figure 3B:
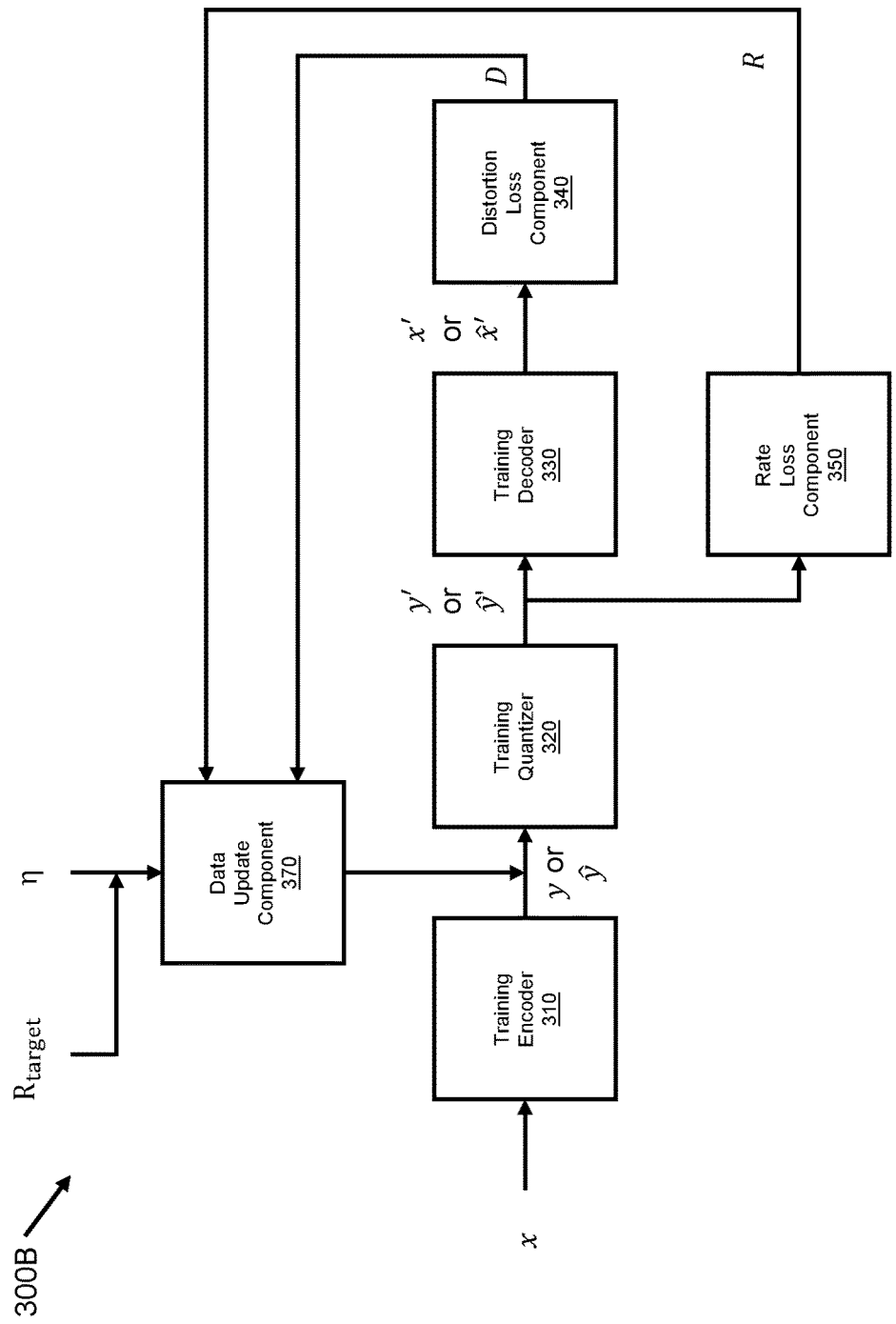
FIG. 3B is a block diagram of a training apparatus for feature substitution for end-to-end image compression with bitrate constraint, during the training stage, according to embodiments.

FIG. 3B is a block diagram of a training apparatus 300B for feature substitution for end-to-end image compression with bitrate constraint, during a training stage, according to embodiments.

As shown in FIG. 3B, the training apparatus 300B includes the training encoder 310, the training quantizer 320, the training decoder 330, the distortion loss component 340, the rate loss component 350 and a data update component 370.

Given the input image x and the target bitrate $B_{target}$, in the training stage, the training encoder 310 learns a substitutional encoded feature representation $\hat{y}$, which is then used in the test stage to generate a compressed representation $\hat{y}'$ and a reconstructed image $\hat{x}'$. In detail, for each input image x, model weights of the training encoder 310, the training quantizer 320, and the training decoder 330 are initialized or set based on a predetermined encoder, a predetermined quantizer, and a predetermined decoder, respectively. Then, a retraining/finetuning process is conducted in which the data update component 370 computes the updated substitutional encoded feature representation $\hat{y}$. The training quantizer 320 generates the new compressed (quantized) representation $\hat{y}'$, based on the computed substitutional encoded feature representation $\hat{y}$, and the training decoder 330 generates the new reconstructed image based on the generated new compressed representation $\hat{y}'$. A target of the retraining/finetuning process is to optimize an overall loss $L(x, \hat{y}', \hat{x}')$:

$$L(x, y', \hat{x}') = \eta \min(R(\hat{y}') - R_{target}, \epsilon) + D(x, \hat{x}') \quad (4)$$

An entropy estimation approach may be used, in which a predetermined rate loss estimator is used to compute the rate loss $R(\hat{y}')$.

The weights of the predetermined encoder, the predetermined quantizer, the predetermined decoder, and the predetermined rate loss estimator are pre-trained based on a set of training images. In detail, for each training image $x_{tr}$, the same forward inference computation is conducted through encoding, quantization, and decoding to compute a reconstructed image $x_{tr}'$. Then, a distortion loss $D(x_{tr}, x_{tr}')$ and a rate loss $R(y_{tr}')$ are computed. Then, given a pre-trained hyperparameter $\lambda_{tr}$, an overall loss $L_{tr}(x_{tr}, y_{tr}', x_{tr}')$ can be computed:

$$L_{tr}(x_{tr}, y_{tr}', x_{tr}') = R(y_{tr}') + \lambda_{tr} D(x_{tr}, x_{tr}'), \quad (5)$$

whose gradients are used to update the weights of the pre-trained encoder, the pre-trained quantizer, the pre-trained decoder, and the pre-trained rate loss estimator through backpropagation. $R(y_{tr}')$ is the rate loss, $D(x_{tr}, x_{tr}')$ is the distortion loss, and they are defined in the same way as the above paragraphs.

Figure 4:
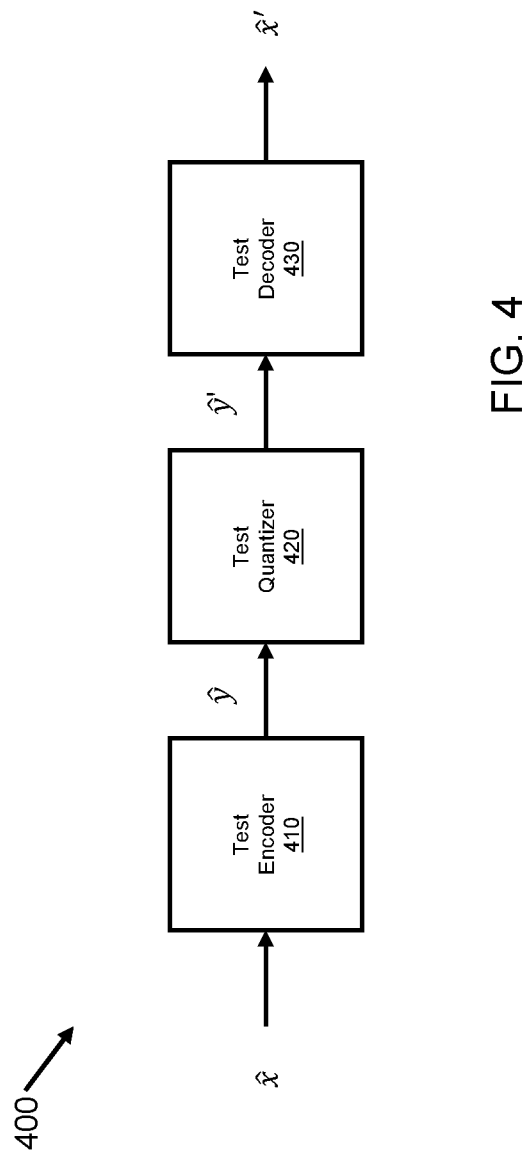
FIG. 4 is a block diagram of a testing apparatus for feature substitution for end-to-end image compression, during a test stage, according to embodiments.

FIG. 4 is a block diagram of a testing apparatus 400 for feature substitution for end-to-end image compression, during a test stage, according to embodiments.

As shown in FIG. 4, the testing apparatus 400 includes a test encoder 410, a test quantizer 420 and a test decoder 430.

In the test stage, using a learned substitutional encoded feature representation $\hat{y}$ as input, the test quantizer 420 and the test decoder 430 are initialized. The test quantizer 420 computes a compressed (quantized) representation $\hat{y}'$, and the test decoder 430 computes a reconstructed image $\hat{x}'$, through forward inference computation.

The test quantizer 420 and the test decoder 430 can be the same with their counterpart training quantizer and training decoder, respectively. They can also be different. In embodiments, the test decoder 430 is the same with the training decoder, while the training quantizer and the test quantizer 420 are different. In detail, the test quantizer 420 may take a general uniform quantization approach, while the training quantizer may be a uniform sampler approximating the effect of test quantizer 420, which avoids the difficulty of gradient backpropagation using discrete numbers.

The above embodiments provide large flexibility in bitrate control and target metric control. When a targeted bitrate is changed, only a hyperparameter $\lambda$ may need to be changed, without retraining/finetuning a pre-trained encoder, a pre-trained quantizer, and a pre-trained decoder. Similarly, when a compressed image that is optimal for different target metrics (e.g., that has an optimal PSNR and/or an optimal SSIM) is to be obtained, only a way to compute distortion loss may be changed, without retraining/finetuning a pretrained E2E image compression network.

Figure 5:
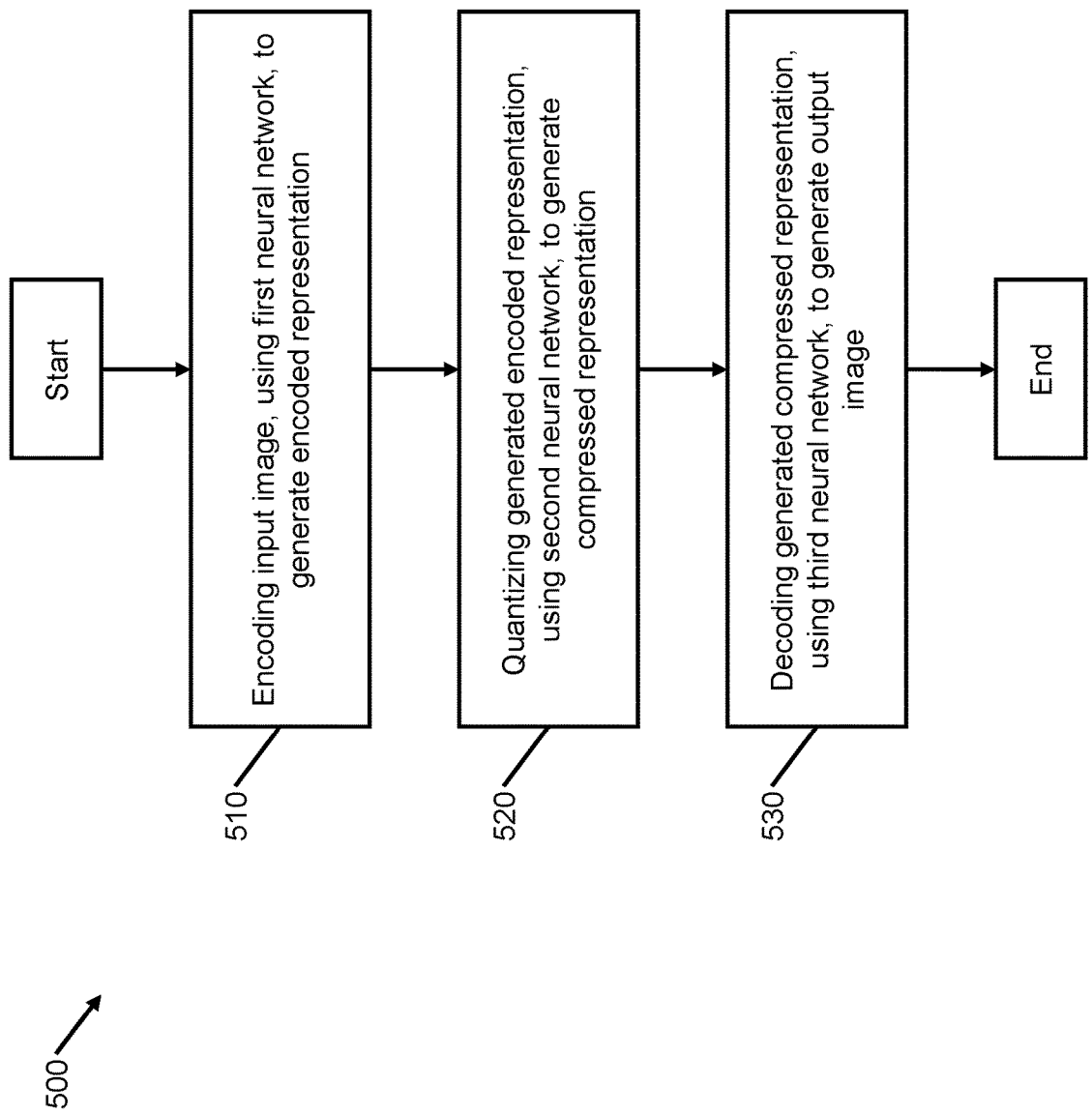
FIG. 5 is a flowchart of a method of feature substitution for end-to-end image compression, according to embodiments.

FIG. 5 is a flowchart of a method of feature substitution for end-to-end image compression, according to embodiments.

In some implementations, one or more process blocks of FIG. 5 may be performed by the platform 120. In some implementations, one or more process blocks of FIG. 5 may be performed by another device or a group of devices separate from or including the platform 120, such as the user device 110.

As shown in FIG. 5, in operation 510, the method 500 includes encoding an input image, using a first neural network, to generate an encoded representation.

In operation 520, the method 500 includes quantizing the generated encoded representation, using a second neural network, to generate a compressed representation.

The first neural network and the second neural network are trained by determining a rate loss, based on a bitrate of the generated compressed representation, and updating the generated encoded representation, based on the determined rate loss.

In operation 530, the method 500 includes decoding the generated compressed representation, using a third neural network, to generate an output image.

The first neural network, the second neural network and the third neural network may be trained by determining a distortion loss corresponding to a reconstruction error between the input image and the generated output image, and updating the generated encoded representation, based on the determined distortion loss, the determined rate loss and an input hyperparameter.

The updating the generated encoded representation may include optimizing an overall loss, based on Equation (1).

The first neural network, the second neural network and the third neural network may be trained by determining a minimum between a difference between the determined rate loss and a target rate loss, and a predetermined hyperparameter, determining a distortion loss corresponding to a reconstruction error between the input image and the generated output image, and updating the generated encoded representation, based on the determined minimum, the determined rate loss and an input hyperparameter.

The updating the generated encoded representation may include optimizing an overall loss, based on Equation (4).

The reconstruction error may include a PSNR and/or a SSIM.

Although FIG. 5 shows example blocks of the method 500, in some implementations, the method 500 may include additional blocks, fewer blocks, different blocks, or differently arranged blocks than those depicted in FIG. 5. Additionally, or alternatively, two or more of the blocks of the method 500 may be performed in parallel.

Figure 6:
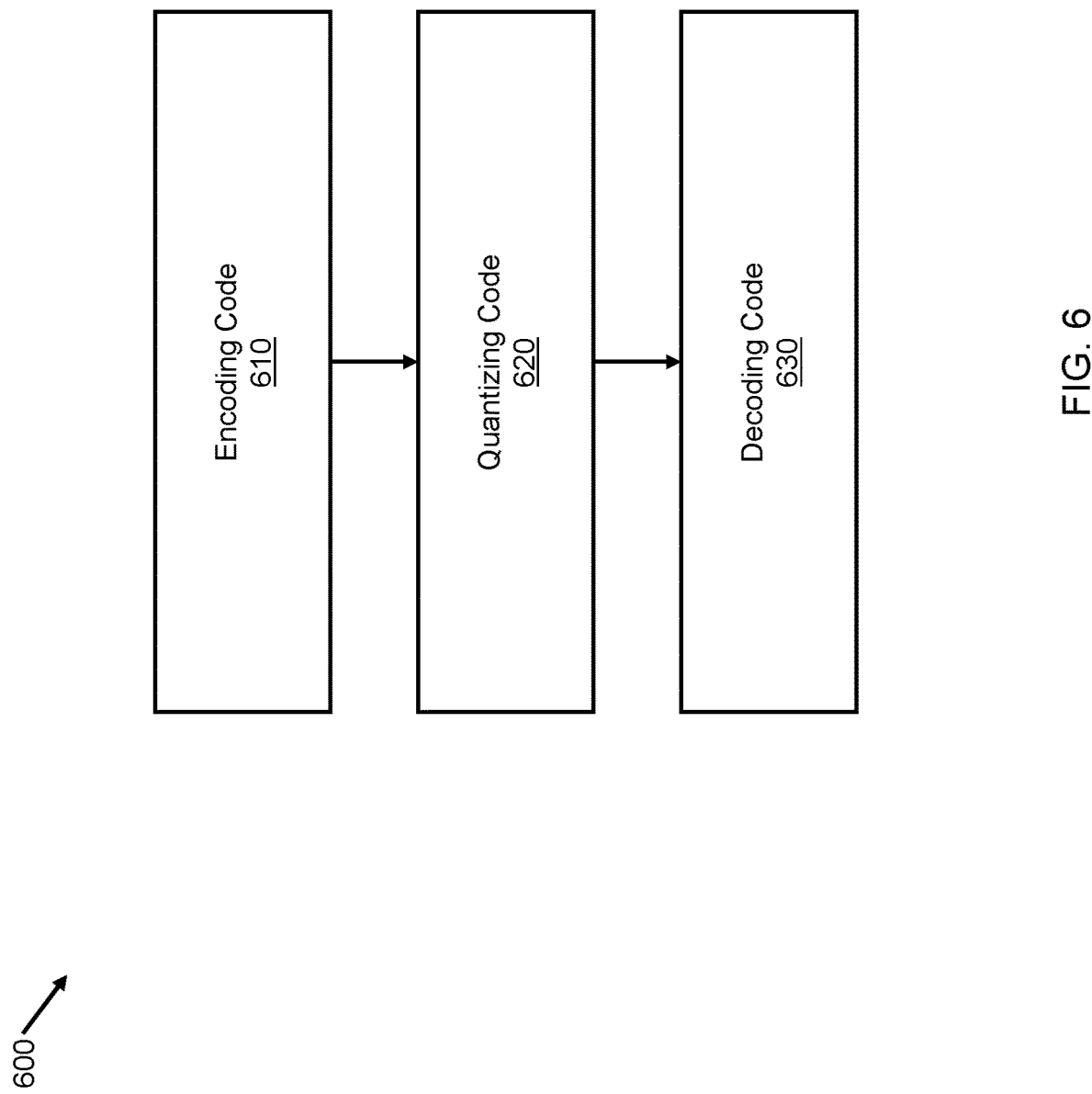
FIG. 6 is a block diagram of an apparatus for feature substitution for end-to-end image compression, according to embodiments.

FIG. 6 is a block diagram of an apparatus 600 for feature substitution for end-to-end image compression, according to embodiments.

As shown in FIG. 6, the apparatus 600 includes encoding code 610, quantizing code 620 and decoding code 630.

The encoding code 610 is configured to cause at least one processor to encode an input image, using a first neural network, to generate an encoded representation.

The quantizing code 620 is configured to cause the at least one processor to quantize the generated encoded representation, using a second neural network, to generate a compressed representation.

The first neural network and the second neural network are trained by determining a rate loss, based on a bitrate of the generated compressed representation, and updating the generated encoded representation, based on the determined rate loss.

The decoding code 630 is configured to cause the at least one processor to decode the generated compressed representation, using a third neural network, to generate an output image.

The first neural network, the second neural network and the third neural network may be trained by determining a distortion loss corresponding to a reconstruction error between the input image and the generated output image, and updating the generated encoded representation, based on the determined distortion loss, the determined rate loss and an input hyperparameter.

The generated encoded representation may be updated by optimizing an overall loss, based on Equation (1).

The first neural network, the second neural network and the third neural network may be trained by determining a minimum between a difference between the determined rate loss and a target rate loss, and a predetermined hyperparameter, determining a distortion loss corresponding to a reconstruction error between the input image and the generated output image, and updating the generated encoded representation, based on the determined minimum, the determined rate loss and an input hyperparameter.

The generated encoded representation may be updated by optimizing an overall loss, based on Equation (4).

The reconstruction error may include a PSNR and/or a SSIM.

Comparing with previous E2E image compression methods, the above embodiments have the following benefits. The above embodiments can be treated as a general preprocess that can be mounted to any E2E image compression DNN model. Also, for each individual input image, its substitutional encoded feature representation may be optimized through an individual retraining/finetuning process based on a feedback of its loss, which can boost compression performance.

Further, the above embodiments can achieve flexible bitrate control, without retraining an E2E image compression model or using multiple models. The above embodiments can achieve flexible target bitrate control, without retraining the E2E image compression model or using multiple models. The above embodiments can change a target compression metric easily without retraining the E2E image compression model.

The proposed methods may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein may be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of feature substitution for end-to-end image compression, the method being performed by at least one processor, and the method comprising:
    encoding an input image, using a first neural network, to generate an encoded representation; and
    quantizing the generated encoded representation, using a second neural network, to generate a compressed representation,
    wherein the first neural network and the second neural network are trained by:
        determining a rate loss, based on a bitrate of the generated compressed representation; and
        updating the generated encoded representation, based on the determined rate loss.

2. The method of claim 1, further comprising decoding the generated compressed representation, using a third neural network, to generate an output image.

3. The method of claim 2, wherein the first neural network, the second neural network and the third neural network are trained by:
    determining a distortion loss corresponding to a reconstruction error between the input image and the generated output image; and
    updating the generated encoded representation, based on the determined distortion loss, the determined rate loss and an input hyperparameter.

4. The method of claim 3, wherein the updating the generated encoded representation comprises optimizing an overall loss, based on the following equation:

$$L(x,y',\hat{x}')=R(\hat{y}')+\lambda D(x,\hat{x}')$$

where $L(x,y',\hat{x}')$ is the overall loss, $R(\hat{y}')$ is the rate loss determined based on the bitrate of the generated compressed representation $\hat{y}'$, $\lambda$ is the input hyperparameter and $D(x, \hat{x}')$ is the distortion loss corresponding to the reconstruction error between the input image x and the generated output image $\hat{x}$.

5. The method of claim 2, wherein the first neural network, the second neural network and the third neural network are trained by:
    determining a minimum between a difference between the determined rate loss and a target rate loss, and a predetermined hyperparameter;
    determining a distortion loss corresponding to a reconstruction error between the input image and the generated output image; and
    updating the generated encoded representation, based on the determined minimum, the determined rate loss and an input hyperparameter.

6. The method of claim 5, wherein the updating the generated encoded representation comprises optimizing an overall loss, based on the following equation:

$$L(x,y',\hat{x}')=\eta\ \min(R(\hat{y}')-R_{target},\epsilon)+D(x,\hat{x}'),$$

where $L(x,y',\hat{x}')$ is the overall loss, $\eta$ is the input hyperparameter, $R(\hat{y}')$ is the rate loss determined based on the bitrate of the generated compressed representation $\hat{y}'$, $R_{target}$ is the target rate loss, $\epsilon$ is the predetermined hyperparameter and $D(x,\hat{x}')$ is the distortion loss corresponding to the reconstruction error between the input image x and the generated output image $\hat{x}'$.

7. The method of claim 5, wherein the reconstruction error comprises a peak signal-to-noise ratio (PSNR) and/or a structural similarity index measure (SSIM).

8. An apparatus for feature substitution for end-to-end image compression, the apparatus comprising:
    at least one memory configured to store program code; and
    at least one processor configured to read the program code and operate as instructed by the program code, the program code comprising:
        encoding code configured to cause the at least one processor to encode an input image, using a first neural network, to generate an encoded representation; and
        quantizing code configured to cause the at least one processor to quantize the generated encoded representation, using a second neural network, to generate a compressed representation,
    wherein the first neural network and the second neural network are trained by:
        determining a rate loss, based on a bitrate of the generated compressed representation; and
        updating the generated encoded representation, based on the determined rate loss.

9. The apparatus of claim 8, further comprising decoding code configured to cause the at least one processor to decode the generated compressed representation, using a third neural network, to generate an output image.

10. The apparatus of claim 9, wherein the first neural network, the second neural network and the third neural network are trained by:
    determining a distortion loss corresponding to a reconstruction error between the input image and the generated output image; and
    updating the generated encoded representation, based on the determined distortion loss, the determined rate loss and an input hyperparameter.

11. The apparatus of claim 10, wherein the generated encoded representation is updated by optimizing an overall loss, based on the following equation:

$$L(x,y',\hat{x}')=R(\hat{y}')+\lambda D(x,\hat{x}'),$$

where L(x,y',x̂') is the overall loss, R(ŷ') is the rate loss determined based on the bitrate of the generated compressed representation ŷ', λ is the input hyperparameter and D(x,x̂') is the distortion loss corresponding to the reconstruction error between the input image x and the generated output image x̂'.

12. The apparatus of claim 9, wherein the first neural network, the second neural network and the third neural network are trained by:
   determining a minimum between a difference between the determined rate loss and a target rate loss, and a predetermined hyperparameter;
   determining a distortion loss corresponding to a reconstruction error between the input image and the generated output image; and
   updating the generated encoded representation, based on the determined minimum, the determined rate loss and an input hyperparameter.

13. The apparatus of claim 12, wherein the generated encoded representation is updated by optimizing an overall loss, based on the following equation:

$$L(x,\hat{y}',\hat{x}')=\eta \min(\hat{y}')-R_{target},\epsilon)+D(x,\hat{x}'),$$

where L(x,y',x̂') is the overall loss, η is the input hyperparameter, R(ŷ') is the rate loss determined based on the bitrate of the generated compressed representation ŷ', $R_{target}$ is the target rate loss, ϵ is the predetermined hyperparameter and D(x,x̂') is the distortion loss corresponding to the reconstruction error between the input image x and the generated output image x̂'.

14. The apparatus of claim 12, wherein the reconstruction error comprises a peak signal-to-noise ratio (PSNR) and/or a structural similarity index measure (SSIM).

15. A non-transitory computer-readable medium storing instructions that, when executed by at least one processor for feature substitution for end-to-end image compression, cause the at least one processor to:
   encode an input image, using a first neural network, to generate an encoded representation; and
   quantize the generated encoded representation, using a second neural network, to generate a compressed representation,
   wherein the first neural network and the second neural network are trained by:
      determining a rate loss, based on a bitrate of the generated compressed representation; and
      updating the generated encoded representation, based on the determined rate loss.

16. The non-transitory computer-readable medium of claim 15, wherein the instructions, when executed by the at least one processor, further cause the at least one processor to decode the generated compressed representation, using a third neural network, to generate an output image.

17. The non-transitory computer-readable medium of claim 16, wherein the first neural network, the second neural network and the third neural network are trained by:
   determining a distortion loss corresponding to a reconstruction error between the input image and the generated output image; and
   updating the generated encoded representation, based on the determined distortion loss, the determined rate loss and an input hyperparameter.

18. The non-transitory computer-readable medium of claim 17, wherein the generated encoded representation is updated by optimizing an overall loss, based on the following equation:

$$L(x,y',\hat{x}')=R(\hat{y}')+\lambda D(x,\hat{x}'),$$

where L(x,y',x̂') is the overall loss, R(ŷ') is the rate loss determined based on the bitrate of the generated compressed representation ŷ', λ is the input hyperparameter and D(x, x̂') is the distortion loss corresponding to the reconstruction error between the input image x and the generated output image x̂'.

19. The non-transitory computer-readable medium of claim 16, wherein the first neural network, the second neural network and the third neural network are trained by:
   determining a minimum between a difference between the determined rate loss and a target rate loss, and a predetermined hyperparameter;
   determining a distortion loss corresponding to a reconstruction error between the input image and the generated output image; and
   updating the generated encoded representation, based on the determined minimum, the determined rate loss and an input hyperparameter.

20. The non-transitory computer-readable medium of claim 19, wherein the generated encoded representation is updated by optimizing an overall loss, based on the following equation:

$$L(x,y',\hat{x}')=\eta \min(R(\hat{y}')-R_{target},\epsilon)+D(x,\hat{x}'),$$

where L(x,y',x̂') is the overall loss, η is the input hyperparameter, R(ŷ') is the rate loss determined based on the bitrate of the generated compressed representation ŷ', $R_{target}$ is the target rate loss, ϵ is the predetermined hyperparameter and D(x,x̂') is the distortion loss corresponding to the reconstruction error between the input image x and the generated output image x̂'.

* * * * *